United States Patent
Subramanian et al.

(10) Patent No.: US 10,122,550 B2
(45) Date of Patent: Nov. 6, 2018

(54) INBAND DATA GATHERING WITH DYNAMIC INTERMEDIARY ROUTE SELECTIONS

(75) Inventors: Balan Subramanian, Cary, NC (US); Christian Lee Hunt, Cary, NC (US); Denilson Nastacio, Apex, NC (US); Roger Michael Meli, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 977 days.

(21) Appl. No.: 12/705,954

(22) Filed: Feb. 15, 2010

(65) Prior Publication Data
US 2011/0202683 A1     Aug. 18, 2011

(51) Int. Cl.
*H04L 12/64* (2006.01)
(52) U.S. Cl.
CPC ............................... *H04L 12/6418* (2013.01)
(58) Field of Classification Search
CPC .......................................... G06F 15/16
USPC ................................ 709/223, 224
See application file for complete search history.

(56) References Cited

U.S. PATENT DOCUMENTS

| | | | |
|---|---|---|---|
| 8,214,437 B1 * | 7/2012 | Alspector | G06F 17/30707 709/200 |
| 8,305,898 B2 * | 11/2012 | Chang | H04L 45/308 370/235 |
| 2003/0055670 A1 * | 3/2003 | Kryskow et al. | 705/1 |
| 2004/0001498 A1 * | 1/2004 | Chen et al. | 370/401 |
| 2004/0019645 A1 * | 1/2004 | Goodman | G06Q 10/107 709/206 |
| 2004/0083291 A1 * | 4/2004 | Pessi | H04L 65/605 709/227 |
| 2004/0121765 A1 * | 6/2004 | Idnani | H04L 29/06027 455/422.1 |
| 2005/0108251 A1 * | 5/2005 | Hunt | G06F 9/546 |
| 2005/0108347 A1 * | 5/2005 | Lybeck | H04L 29/06 709/207 |
| 2006/0179342 A1 | 8/2006 | Reed et al. | |
| 2007/0033194 A1 | 2/2007 | Srinivas et al. | |
| 2007/0100836 A1 * | 5/2007 | Eichstaedt | G06F 17/3089 |
| 2007/0192706 A1 | 8/2007 | Bruce et al. | |
| 2008/0155089 A1 | 6/2008 | Hun et al. | |
| 2008/0247320 A1 | 10/2008 | Grah et al. | |

(Continued)

FOREIGN PATENT DOCUMENTS

| | | |
|---|---|---|
| WO | WO2003058868 | 7/2003 |
| WO | WO2008020434 | 2/2008 |

OTHER PUBLICATIONS

NPL1—Title: Scalable Query Result Caching for Web Applications, by Charles et al; PVLDB '08, Aug. 23-28, 2008.*

(Continued)

*Primary Examiner* — Backhean Tiv
(74) *Attorney, Agent, or Firm* — Grasso PLLC (57) ABSTRACT

Managing subscriptions over a network, where the network comprises intermediaries, clients, and service providers. Certain embodiments provide for receiving a subscription at a network intermediary, the subscription having management application data and application level header information, reviewing the application level header information of the received subscription, and redirecting the subscription over the network using the reviewed application level header information.

21 Claims, 4 Drawing Sheets

(56) References Cited

U.S. PATENT DOCUMENTS

| | | | |
|---|---|---|---|
| 2009/0064324 A1 | 3/2009 | Hunt et al. | |
| 2009/0125628 A1* | 5/2009 | Dahlen | H04L 67/16 |
| | | | 709/227 |
| 2009/0150565 A1 | 6/2009 | Grossner et al. | |
| 2009/0182610 A1* | 7/2009 | Palanisamy | G06Q 10/06 |
| | | | 707/600 |
| 2009/0265358 A1* | 10/2009 | Morris | G06F 17/30864 |
| 2011/0202683 A1* | 8/2011 | Subramanian | H04L 12/6418 |
| | | | 709/244 |
| 2012/0166615 A1* | 6/2012 | Subramanian | H04L 12/6418 |
| | | | 709/223 |

OTHER PUBLICATIONS

William Tay, Routing Secured SOAP Messages Through Multiple SOAP Intermediaries Using WSE 2.0, http://msdn.microsoft.com/en-us/library/ms977358(d=printer).aspx., Mar. 2005, United States.

* cited by examiner

INBAND DATA GATHERING WITH DYNAMIC INTERMEDIARY ROUTE SELECTIONS

BACKGROUND

The field of invention involves intermediaries serving between client applications and service providers over a network. More specifically, network intermediaries providing dynamic proxying between client applications and service providers are described and provided herein.

Modern networks are regularly organized in a client-application and service-provider configuration. Under this configuration, a client application may obtain information or services over the network from service providers when carrying out client functionality. The service providers may be providing data, messages, data manipulation, or the like, to the clients in these examples. The service providers may be providing services to a single client or multiple clients across a network. The clients may be requesting the services from the providers because the providers are better situated or configured than the client to obtain the data or provide the services. These services may be requested on a subscription basis.

Modern networks have been configured using a Service Oriented Architecture (SOA) in order to package services for use by numerous clients or domains. SOA architecture can be configured to use a mesh of unassociated and loosely coupled software services to provide various functions throughout the network. These software services have no calls to each other embedded in their code. Rather, instead of embedding service calls to each other in their source code, agreed upon protocols are used to pass messages and requests between them.

SOA can serve to separate functions, offered over a network, into distinct units and services. These distinct units and services may be offered to allow clients to combine and reuse the discrete units and services in various applications over the network. Software modules in an SOA may communicate over the network to each other and to client applications by passing data over the network from one software module to another software module and, by themselves, coordinating an activity between two or more modules.

Networks employing an SOA have a need to enable applications running on different platforms or operating systems to communicate with each other at the application level. This need has been addressed by the Simple Object Access Protocol (SOAP), an application level solution. SOAP is a language and platform-independent XML syntax for exchanging messages over a network. SOAP defines a set of rules for structuring messages that can be used for simple one-way messaging. SOAP also serves to codify the use of XML and HTTP across networks and computing platforms. As an example, if an application is running on a LINUX® based system and wishes to communicate with the same application running on a Windows 7® based system this communication may be possible through the use of SOAP. SOAP facilitates this communication across operating systems at the application level (e.g., a word processor or spreadsheet application) by using HTTP and XML for the exchange of information.

SOAP requests, using XML, can contain three parts: a) process framework to describe what is in a SOAP message and how to process the message; b) application encoding rules for expressing data types of a message; and c) a convention for remote procedure calls, responses, and error handling.

BRIEF SUMMARY

As described herein, embodiments of the invention may use application level intermediaries, such as intermediaries employing SOAP, in a network, such as an SOA network, to dynamically manage services being provided to client applications over the network. This dynamic management may include intermediary intervention that may serve to change the source of provided services, to retrieve messages downstream of the service provider, and to position service providers more closely to client applications. The intermediaries may handle messages from service providers in order to optimize the routes in which the messages are sent between services and clients in an SOA. These intermediaries may also serve to shorten the length the messages need to travel in the SOA, to search for data missing for a particular application, to broker between services, to query peer intermediaries for missing data, and for other uses as well. The messages serviced by the intermediaries may contain instructions or calls for services, data for use, client subscriptions, and other information or instructions.

Embodiments include network devices, systems, methods, and computer readable medium. The network devices may include a controller programmed to review application level information at a subscription and, after reviewing this information, redirecting a subscription over a network using the application level information in the subscription. In certain embodiments the subscription may be redirected to peer-network intermediaries, some of which are closer to the service provider and some of which serve to proxy a subscription from a client management application. In certain embodiments, the controller may be programmed to execute instructions that consolidate rules of the subscriptions, consolidate rules across subscriptions, and specify new data formats for a subscription.

Embodiments may also include a method wherein operating instructions at a microcontroller cause one or more microcontrollers to generate subscription management data, send the subscription management data to a SOAP intermediary over an SOA network, evaluate the subscription management at the SOAP intermediary, compare service level indicators at the SOAP intermediary and send the subscription management data to a client management application.

Embodiments may also include computer readable storage medium having stored thereon instructions, which, when executed by a microprocessor, cause the microprocessor to review application level information at a subscription and, after reviewing this information, redirecting a subscription over a network using the application level information in the subscription. In certain embodiments instructions may cause the microprocessor to redirect the subscription to peer network intermediaries, some of which are closer to the service provider and some of which serve to proxy a subscription from a client management application. In certain embodiments, the controller may be programmed by the instructions to execute instructions that consolidate rules of the subscriptions, consolidate rules across subscriptions, and specify new data formats for a subscription.

DETAILED DESCRIPTION

Various embodiments of in-band data gathering with dynamic intermediary route selection are provided herein. The invention may be reflected in these embodiments, portions of these embodiments, combinations of these embodiments, and other embodiments as well.

In one embodiment the efficiency of data transformation, like event format conversion, aggregation etc., as may be used by multiple consumers is provided. In this embodiment, at least two approaches may be provided.

In one approach, SOAP intermediaries, which are intermediaries that accept and transmit SOAP protocol messages or information, proxy on behalf of client management applications. In this approach, the network intermediary may be managing the proxying while the client management application is not aware, nor is it made aware, of any change in subscription. In so doing, the burden associated with proxying the subscription may be reduced.

SOAP intermediaries can be used to broker between services and management systems. This can involve client-based management systems registering for particular management information with intermediaries which become known through a registry or by a broadcast trial and error mechanism or by a peer-to-peer communication and acknowledgement. In one approach, subscriptions from a client management application may be transparently redirected by one or more intermediaries to other intermediaries.

Still further, SOAP intermediaries in an SOA network may be used to broker the management data subscriptions between client management applications and service providers that may be producers of management data. SOAP intermediaries may review and consider application level headers or information to proxy or broker rather than transport level headers or information. By considering application level header information, a network intermediary may have the ability to continually collect data as produced even in the light of different patterns in routing of SOAP messages in an SOA based solution. This may be beneficial in at least an embodiment where there is at least some isolation of the client management application from rapid changes in an SOA network.

Embodiments may include proxying subscriptions from management applications. On timeout of a SOAP intermediary realizing that it hasn't seen the data required to satisfy a particular subscription, which can be desired or set by a Service Level Agreement ("SLA") between the intermediary and the client management application, the SOAP intermediary may reroute a subscription request to multiple peers. Peers that have seen the data flows recently may accept the request and take up the responsibility of collecting the data.

In certain embodiments, the SOAP intermediary may register a subscription on behalf of a management application. In so doing, the client management application may only rely on the network of the SOAP intermediaries and its subscription need not be changed. However in this example, to manage additional message volume, and minimize it, an on-behalf subscription may only be made to one level of redirection. For two-level or more redirects, the intermediaries may switch to a second mode of operation but still retain the management application's subscription intact.

In certain embodiments, the subscription may be transferred over to a new intermediary that can provide the required information for the subscription. The management application may also be notified so that the details of the subscription are timely in the event that a client wishes to terminate or manage the subscription itself.

In certain embodiments, a hybrid mechanism may be used. Here, SOAP intermediaries that are proxying frequently for another SOAP intermediary may constantly evaluate the resources being spent on proxying and the frequency of the proxying. This expenditure and frequency may be evaluated and compared to regular brokering responsibilities. If a threshold is hit or a Service Level Agreement may not be satisfied, the intermediary may transfer the subscription over to another intermediary including a SOAP intermediary.

In certain embodiments, network intermediaries may execute a proactive progression of subscriptions that serve to consolidate subscriptions or self-optimize the intermediaries or both. In certain embodiments, peer intermediaries may proactively communicate with senders of messages in which interest has been expressed and progressively move subscriptions closer towards service. SOAP intermediaries may be aware of the origin of subscription data being sent to them. Over time, when a SOAP intermediary recognizes that information required by subscribed management applications is provided because of SOAP messages coming from a preceding SOAP intermediary, it may proactively transfer the subscription to that upstream SOAP intermediary. The net effect is that, with the passage of time, the subscriptions may move closer to the service provider itself. This movement of subscriptions may serve to reduce the number of times the same headers need to be parsed to extract the same data. In so doing, the repetitious or unneeded management data in headers can be removed sooner. In so doing, an intermediary may continue to support the subscription from a client by becoming a client of another intermediary that has the requested monitoring information.

In embodiments, the data transformation and management of the transformations can be optimized or streamlined as well. These efficiencies may be realized by movement of the processing rules associated with a subscription.

In embodiments, rules may be provided by subscribers and may be moved closer to a source of data. Here, client management applications may provide rules for data conversions—for example GLA adapter rules if the management applications expect the data to be made available to them in particular formats. Rule correlation may also occur when SOAP intermediaries are expected to carry out low-level event correlation and aggregation.

In embodiments, when subscriptions are transferred, the assignee SOAP intermediary may automatically receive the new rules. Here, the intermediary may consolidate the rules together and when similarities are found, remove the redundancy such that a single data conversion can be used to satisfy the requirements of multiple registrants. They will be consolidated at points where multiple subscriptions requests from different consumers that are similar in nature have arrived by the progression explained above.

In certain embodiments, as an enhancement, the movement of subscriptions may be based on analysis of the flow patterns seen in the network intermediaries. This movement of subscriptions may be managed to occur proactively as opposed to being a reaction to missed management data as discussed elsewhere. Pattern analysis may happen at a central point in an SOA network or at each intermediary. An intermediary may then predict with some reasonable level of certainty as to which SOAP intermediary will next see the expected flow and proactively transfer the subscription over or start proxying for that SOAP intermediary. The flow analysis may include communications to and from a registry storing or retaining flow patterns and subscriptions moving over the network.

Figure 1:
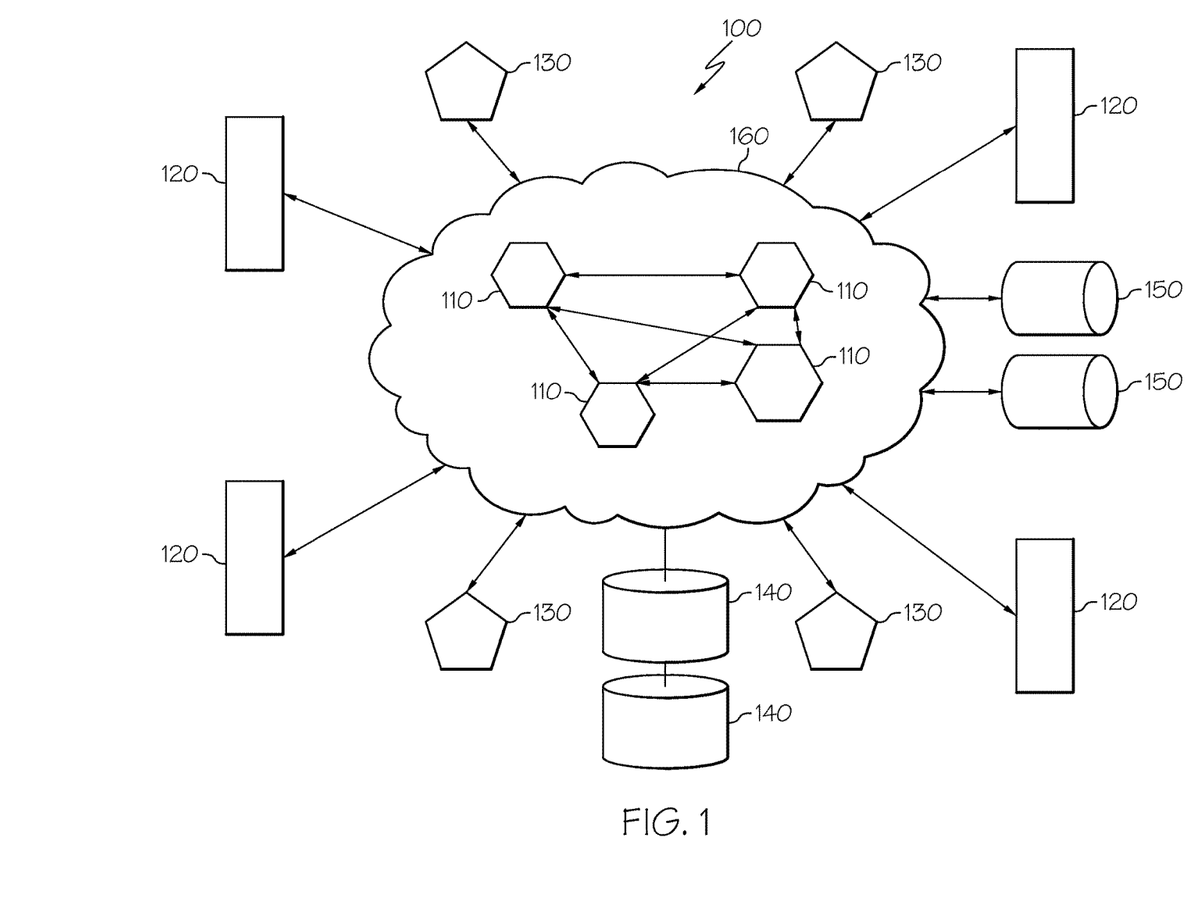
FIG. 1 shows a network with intermediaries in accord with embodiments of the invention.

FIG. 1 shows a network 100 of interconnected computers, storage facilities, and servers. The network 100 may include a sub-network 160 of interrelated network intermediaries 110, network storage devices 150, service providers 120, registries 140, and client management applications 130. Both the network 100 and the subnetwork 160 may be cloud networks, wide-area network, local networks, and other styles of networks as well. In embodiments the network 100 may be an SOA network. The client management applications 130 may be run on stand-alone client computers as well as on other platforms. These other platforms may include server applications. The client management applications may generate subscriptions for data needed for the management applications running on the clients. These subscription requests may be routed through the network 100 and sub-network 160 until one or more service providers 120 are reached. The service provider 120 may then register the subscription locally and/or at the registry 140. Data collected, generated, or calculated by the service provider may be sent over the networks to the client management application 130 as the data become available. This subscription fulfillment data may be routed in the subnetwork 160 by the network intermediaries 110 reviewing and considering application level headers in the data rather than transport level header information. In so doing, the subscription fulfillment data may be more quickly and efficiently routed throughout the subnetwork 160.

As described throughout, the network intermediaries 110 may take on proxying responsibilities when fulfilling subscription requests such the service providers 120 do not need to identify or track when and which client management application subscription fulfillment data is sent and when it needs to be sent. As also described throughout, the network intermediaries may manage the subscription requests from the client management applications. This management of the subscriptions may be stored locally as well as at network storage locations or other locations accessible by the network. When a network intermediary uses SOAP to communicate or exchange data throughout the Network it may be referred to as a SOAP intermediary. Network interface applications other than SOAP may also be used by the network applications.

Figure 2:
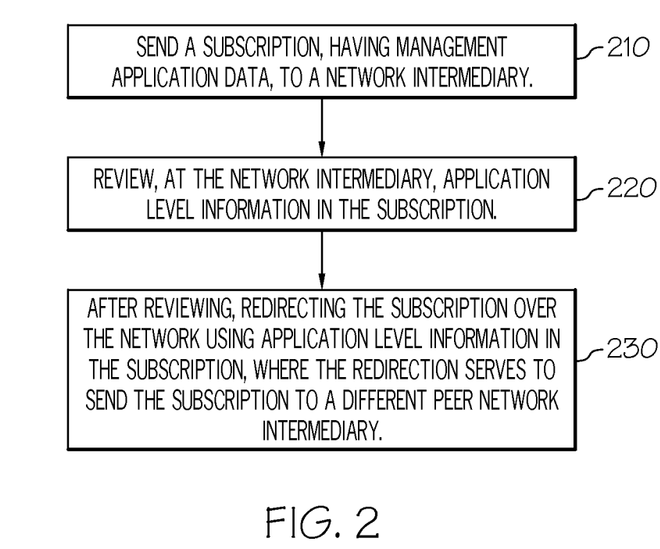
FIG. 2 is a flowchart of a method that may be partially or fully employed in accord with embodiments of the invention.

FIG. 2 shows a method that may be stored as instructions on computer readable storage medium as well as carried out one or more of the devices in the network of FIG. 1. When carried out in-part or in-full by the network devices, the network device may store the instructions in nonvolatile memory. The method of FIG. 2 includes, at 210, sending a subscription that has management application data to a network intermediary. This subscription may be generated by the client management application or routed from another network device, such as an intermediary, storage device, registry, or service provider. At step 220, the subscription may be reviewed at the network intermediary by considering application level information in the subscription. This application level information may be used to route or manage the subscription information. In certain embodiments, SOAP headers and interfaces may be used for carrying and considering the application level information. At 230, after reviewing the application level information, the subscription or the subscription data may be redirected over the network using the application level data. The subscription may be redirected to another peer network intermediary as well as to a registry or data storage device.

Figure 3:
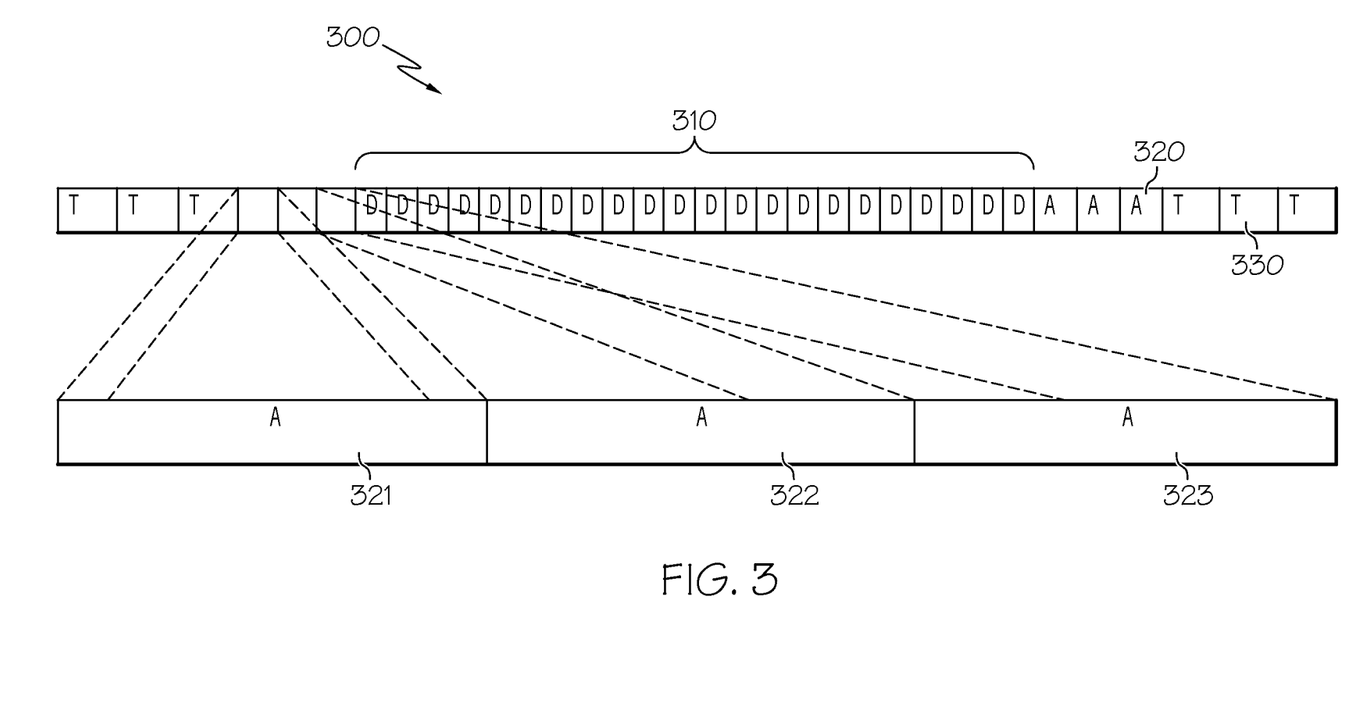
FIG. 3 shows header information from a subscription that may be employed in accord with embodiments of the invention.

FIG. 3 shows a packet 300 with transport level 330, application level 320, and data information 310. This packet may be routed throughout a network, including the network 100 of FIG. 1. The packet 300 may reflect a subscription or subscription data in embodiments of the invention. As the packet and its accompanying data 310 is routed through the network, rather than consider transport level header and footer information 330, the network intermediaries may consider application level information at 321, 322, and 323. This application level information may be used to route the packet around and through the network and to satisfy the subscription data request associated with the data 310.

In a SOAP intermediary, 321 may contain process framework to describe what is in the SOAP message and how to process the message, 322 may contain application encoding rules for expressing data types of the message, and 323 may contain conventions for remote procedure calls, responses, and error handling. Subscription rules and routing may also be located or encoded in one or more of 321-323. In so doing, network intermediaries may not only handle and manage the data 310 through the SOAP header information, the routing of and management of the subscription may be considered and addressed as well.

In embodiments, various message protocols may be used, including SOAP and others. These various protocols would preferably have header and body sections where additional information, which may or may not be related to the body content, can be passed through the header. Thus, in embodiments, monitoring information about a resource may be carried in SOAP messages or other protocol messages that are passing through a particular resource in an SOA network.

Figure 4:
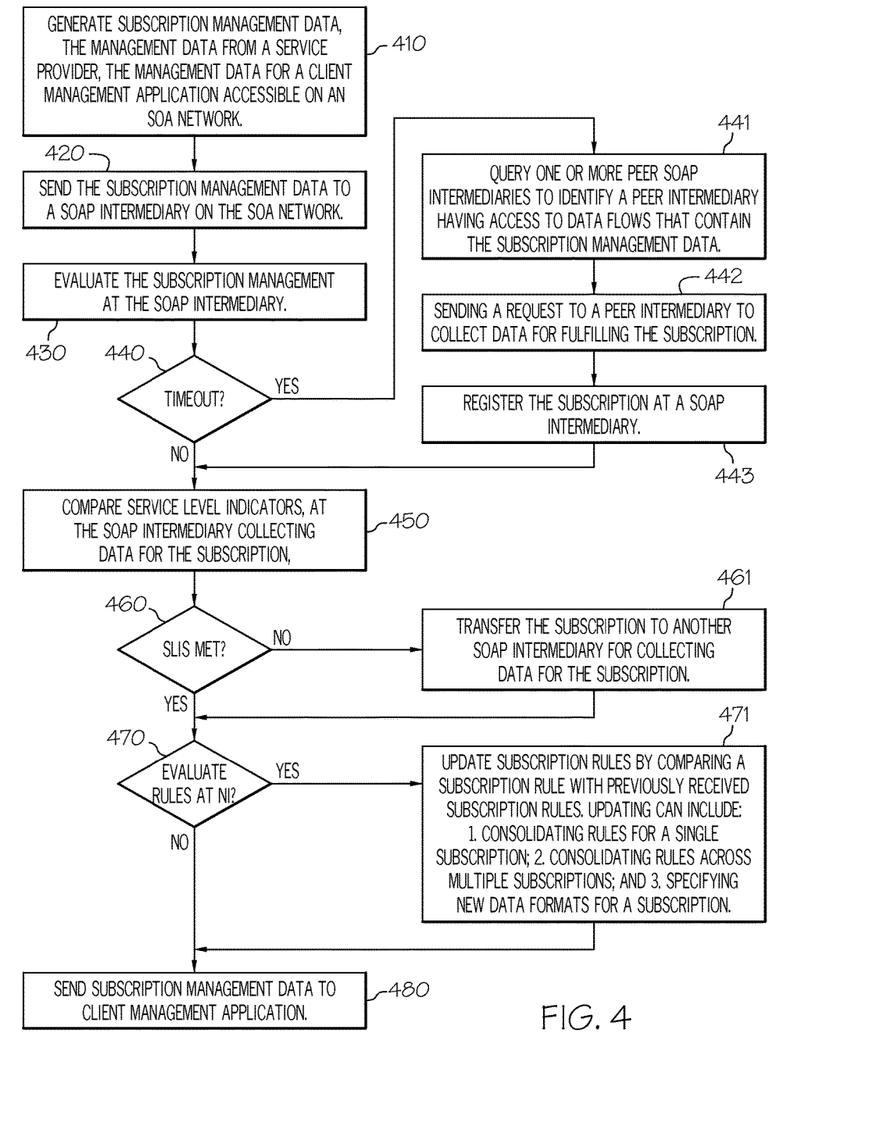
FIG. 4 is a flowchart of a method that may be partially or fully employed in accord with embodiments of the invention.

FIG. 4 shows a flowchart of a method or methods that may be employed in accord with embodiments. The method and flow chart of FIG. 4 is described with respect to an SOA network using SOAP intermediaries. Other network configurations and application level communication protocols may also be considered. At 410, a subscription for management data may be generated by a client management application. This subscription may be transportable and accessible over an SOA network. This subscription may then be sent, as reflected at 420, over a network to a SOAP intermediary on the network. The SOAP intermediary may then evaluate the subscription and manage the subscription as well. This management may include gathering data sent by service providers that fulfills the subscription request in order to send the data back to the client management application. This gathering of data may continue for a certain time. If no data has been gathered or inadequate data has been gathered a time out may occur as shown at 440. If a timeout occurs, then a query of one or more SOAP intermediaries may occur. As shown at 441, this query may include having peer intermediaries with access to applicable subscription data flows identified. Once identified, a request may be sent so that the peer intermediary gathers the needed data. At 443, the intermediary gathering the subscription request may be registered in the network at a registry.

As the data is gathered, either by a peer intermediary or the original intermediary, service level indicators may be considered to determine if the collected data satisfies the subscription request. If the data does not satisfy the SLIs, the subscription may be transferred to another intermediary, as shown at 461. This new intermediary may then manage the data collection for the subscription.

At 470, rules for the subscription may also be considered by the intermediary as well. If the rules are not considered, the management data may be sent to the client management application as shown at 480. If the rules are considered, the rules may be consolidated with other rules, may be consolidated across multiple subscriptions, and may be used to specify new data formats for subscriptions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The same ideas disclosed within the context of a SOA in this disclosure are applicable to managing applications/resources deployed in a cloud.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A first network intermediary device configured to manage subscriptions over a network, the network comprising a plurality of peer network intermediary devices communicating with each other using a first communication protocol, clients, and service providers, the first network intermediary device comprising a controller device executing instructions, which when executed cause the first network intermediary device to:
   identify a flow pattern for movement of subscriptions in the plurality of peer network intermediary devices;
   receive a subscription using a first network communication protocol, the subscription having management application data and application level header information;
   review the application level header information of the subscription;
   redirect the subscription upstream over the network using the application level header information based; and
   manage proxying of a client management application subscription while the client management application is not aware of change in its subscription,
   wherein managing proxying of the client management application subscription includes querying one or more peers of the first network intermediary device to identify one or more upstream peer network intermediary devices having access to data flows having the data flow pattern that contain the management application data for the subscription, the one or more peer network intermediaries communicating with each other, and the first network device, using the first communication protocol.

2. The first network intermediary device of claim 1 where after the query, the received subscription is redirected by the first network intermediary device to a peer network intermediary device and wherein the first communication protocol is simple object access protocol (SOAP).

3. The first network intermediary device of claim 2 further configured to redirect the subscription to a preceding peer network intermediary device of the plurality of peer network intermediary devices, upstream to the service provider than the first network intermediary device.

4. The first network intermediary device of claim 1 where the first network intermediary device is a simple object access protocol (SOAP) network intermediary device and where the subscription is received over a service oriented architecture network.

5. The first network intermediary device of claim 4 where reviewing the application level header information includes, at the network intermediary, querying a SOAP header.

6. The first network intermediary device of claim 1 wherein the controller is further configured, such that after redirecting the subscription, to register the subscription at a registry accessible over a network.

7. The first network intermediary device of claim 1 wherein the controller is further configured to consolidate one or more subscription rules after comparing rules from received subscriptions.

8. The first network intermediary device of claim 1 wherein the controller is further configured to wait for a timeout period to pass and then query one or more of the plurality of peer network intermediary devices to identify a peer intermediary device having access to data flows having the data pattern containing subscription management data and transferring data collection for the subscription to the peer intermediary device.

9. The first network intermediary device of claim 1 wherein the received subscription was generated from a client management application and the subscription requests periodic data from a service provider accessible over a network according to the flow pattern.

10. The first network intermediary device of claim 1 further configured to review previously received subscription rules and consolidate duplicate rules for a single subscription.

11. A system for managing subscriptions over a service oriented architecture network, the system comprising:
    a web-service configured to generate subscription management data having a flow pattern within the service oriented architecture network, send the generated management data over the service oriented architecture network and, send the generated management data to a simple object application protocol (SOAP) intermediary device;
    one or more peer SOAP intermediary devices configured to identify the flow pattern of the subscription management data;
    one or more peer SOAP intermediary devices configured to evaluate the subscription management data;
    one or more peer SOAP intermediary devices configured to query a peer intermediary device to identify an upstream peer intermediary device having access to data flows having the flow pattern that contain the subscription management data;
    one or more of the peer SOAP intermediary devices further configured to manage proxying of a client management application subscription while the client management application is not aware of change in its subscription; and
    one or more peer SOAP intermediary devices configured to accept SOAP protocol messages from another peer SOAP intermediary device and to proxy a subscription on behalf of a client management application when a previous query from another SOAP intermediary device determines that the SOAP intermediary device has access to data flows having the flow pattern containing the subscription management data,
    wherein the peer SOAP intermediary devices communicate with each other over the network using simple object access protocol (SOAP).

12. The system of claim 11 wherein one or more of the peer SOAP intermediary devices is configured to wait for a period before querying another of the one or more peer SOAP intermediaries.

13. The system of claim 12 wherein one or more of the peer SOAP intermediary devices is configured to send a request to a peer intermediary to collect data for fulfilling a subscription according to the flow pattern.

14. The system of claim 13 wherein one or more of the peer SOAP intermediary devices is further configured to register the subscription at another of the peer SOAP intermediaries upstream to a service provider than the one or more of the peer SOAP intermediary devices.

15. The system of claim 11 wherein one or more of the peer SOAP intermediary devices is further configured to identify and compare service level indicators for the subscription with a service agreement for the service level indicators and to transfer the subscription to another of the peer SOAP intermediaries upstream to a service provider than the one or more of the peer SOAP intermediary devices.

16. The system of claim 11 wherein one or more of the peer SOAP intermediary devices is further configured to transfer the subscription management data to another of the one or more peer SOAP intermediary devices to collect data from data flows having the flow pattern for the subscription.

17. The system of claim 11 wherein one or more of the peer SOAP intermediary devices is further configured to update subscription rules by comparing previously received subscription rules with subsequently received subscription rules.

18. The system of claim 17 wherein the update includes consolidating rules into a single subscription.

19. The system of claim 11 further configured such that a subscription is moved from one of the SOAP intermediary devices to another of the SOAP intermediary devices, the another SOAP intermediary device having previously sent subscription data to one of the SOAP intermediary devices.

20. The system of claim 11 wherein a client is configured to generate the subscription for subscription management data.

21. A nontransitory computer readable medium comprising instructions, which when executed by a SOAP intermediary device, cause the device to:
  identify a flow pattern for movement of subscriptions between one or more peer intermediary network devices;
  accept and transmit SOAP protocol messages or information to the one or more peer intermediary network devices using simple object access protocol (SOAP);
  reroute a subscription request to progressively move the subscription closer towards a service fulfilling the subscription; and
  receive a subscription request query from a downstream peer intermediary network device and upon determining that data flows having the flow pattern for the subscription of the subscription request query have been seen by the SOAP intermediary device, accept responsibility for collecting data flows for use in fulfilling the subscription by the SOAP intermediary device.

* * * * *